United States Patent [19]

Shibata et al.

[11] Patent Number: 6,026,704

[45] Date of Patent: Feb. 22, 2000

[54] STEERING SHAFT

[75] Inventors: Kenji Shibata; Mitsuo Hoshino; Katuhiko Fujita; Hitoshi Matsumoto, all of Gunma-ken, Japan

[73] Assignee: Kabushiki Kaisha Yamada Seisakusho, Gunma-ken, Japan

[21] Appl. No.: 08/904,763

[22] Filed: Aug. 1, 1997

[30] Foreign Application Priority Data

Aug. 2, 1996 [JP] Japan .................................. 8-205107

[51] Int. Cl.⁷ .............................. B62D 1/20; B62D 1/11
[52] U.S. Cl. ............................................. 74/496; 280/777
[58] Field of Search ............................. 280/777; 74/492, 74/493, 494, 495, 496; 403/359; 464/162; 188/371; 285/330

[56] References Cited

U.S. PATENT DOCUMENTS

| | | | |
|---|---|---|---|
| 4,674,354 | 6/1987 | Brand | 74/492 |
| 5,228,720 | 7/1993 | Sato et al. | |
| 5,464,251 | 11/1995 | Castellon | |
| 5,575,501 | 11/1996 | Moriyama et al. | 280/777 |
| 5,640,884 | 6/1997 | Fujiu et al. | 74/492 |

FOREIGN PATENT DOCUMENTS

| | | |
|---|---|---|
| 5-41700 | 2/1993 | Japan |
| 5-332386 | 12/1993 | Japan |
| 2513589 | 7/1996 | Japan |

*Primary Examiner*—Tamara L. Graysay
*Assistant Examiner*—Brandon C. Stallman
*Attorney, Agent, or Firm*—Lowe Hauptman Gopstein Gilman & Berner

[57] ABSTRACT

A steering shaft includes: an outer shaft having an inner splined portion; an inner shaft having a shaft portion and an outer splined portion which are arranged continuously along an axial direction; a retaining portion formed on at least one of the outer splined portion and the shaft portion; a sliding coupling section formed by a coupling portion of the outer shaft and a coupling portion of the inner shaft so as to allow the outer shaft and the inner shaft to be telescopically slidable in the axial direction relative to each other by splines; and a sliding resin member which is filled in a space formed in the sliding coupling section between an opening portion of the outer shaft and the retaining portion of the inner shaft.

5 Claims, 16 Drawing Sheets

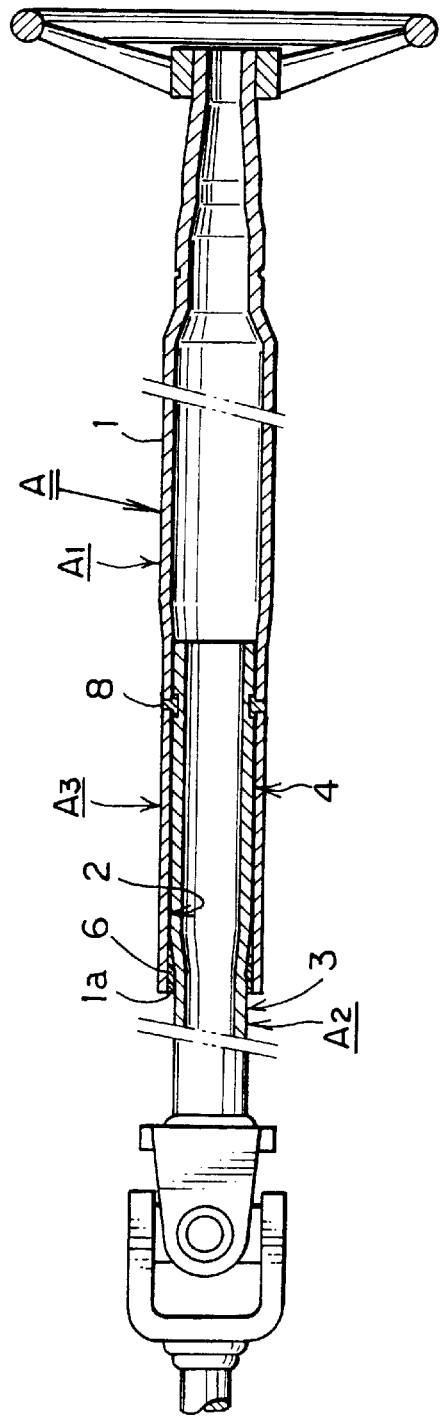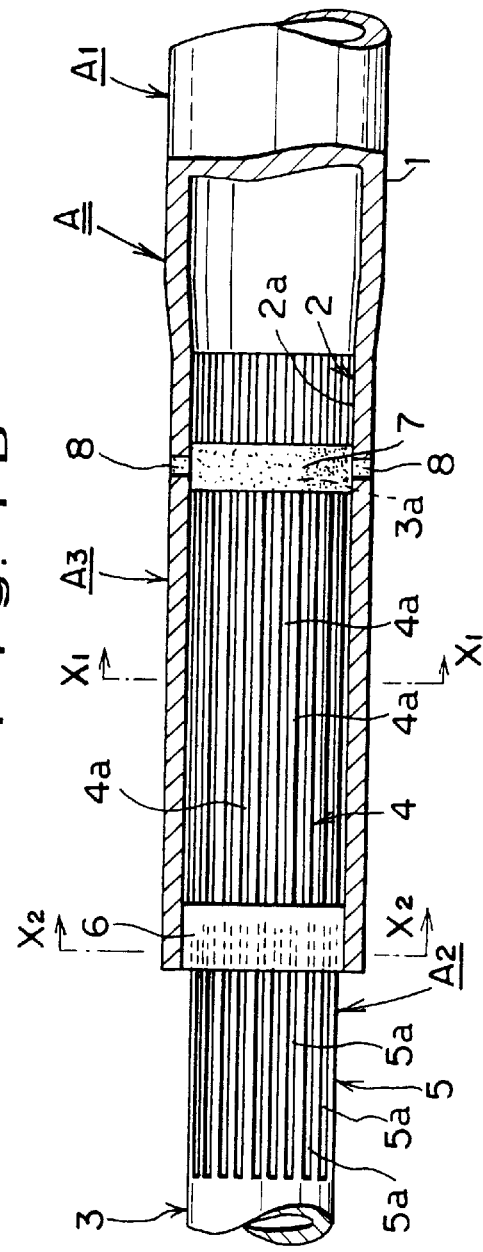

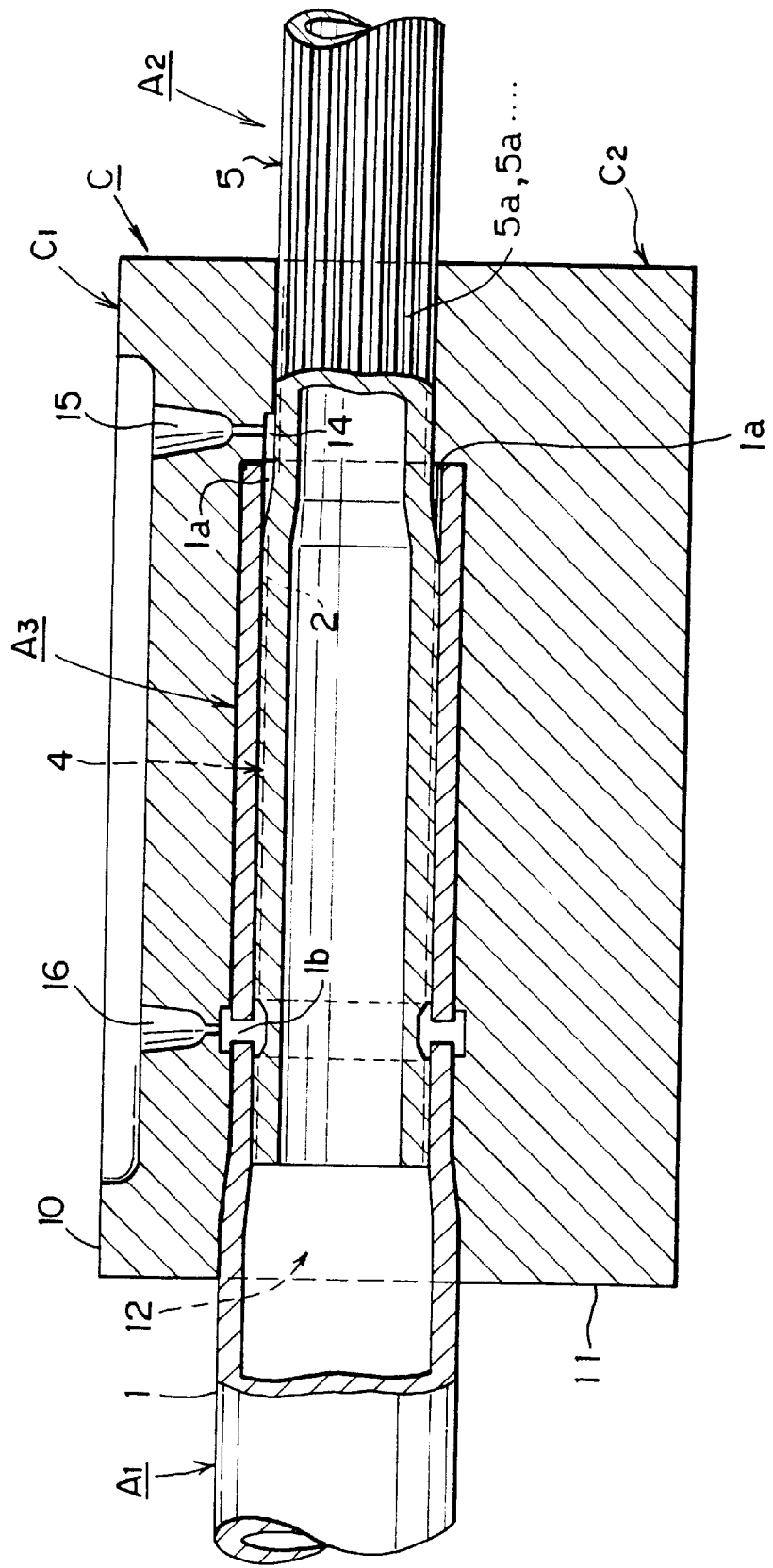

STEERING SHAFT

BACKGROUND OF THE INVENTION

1. Field of the Invention

The present invention relates to a steering shaft which is telescopically contractible to secure the safety of a driver during an accident, such as a collision of a vehicle.

2. Description of the Related Art

Conventionally, a steering shaft which is made telescopically contractible to secure the safety of a driver during an accident, such as a collision of a vehicle, is known as the steering shaft of a steering apparatus. This steering shaft is arranged such that corresponding end portions of a plurality of shafts are fitted over and coupled to each other by means of splines such that the shafts are slidable relative to each other in their axial direction.

Further, a steering shaft is known in which an injection-molded portion which is formed of a synthetic resin is provided in its sliding portion. The injection-molded portion prevents the occurrence of looseness in a fitting coupling section of the steering shaft in a rotating direction.

An inner shaft and an outer shaft are coupled to each other in the axial direction by a splined structure, and the outer shaft and the inner shaft are fixed in the axial direction by shear pins which are formed of a synthetic resin.

The above-described structure is provided for dampening an axially thrusting force applied from a lower portion of the vehicle during a primary collision, e.g., a thrusting force applied from wheels against the steering shaft via a steering gear box.

A sliding member formed of a synthetic resin for supporting favorable sliding is provided between an opening portion of the outer shaft and the inner shaft in a sliding coupling section of the outer shaft and the inner shaft.

Further, the structure provided is such that shear pins formed by injection of a synthetic resin are provided at appropriate positions on the innermost inner peripheral side of the outer shaft, and the shear pins are sheared during a collision, allowing the outer shaft and the inner shaft to telescopically contract and move relative to each other.

However, the steering shafts of the conventional type have the following drawbacks. First, an appropriate clearance is provided in a splined coupling section between the outer shaft and the inner shaft so as to ensure the slidability of the shafts.

In addition, the axial slidability is made stable and favorable by means of the resin sliding member provided between the opening portion of the outer shaft and the inner shaft. Further, the resin sliding member at the opening portion of the outer shaft blocks the clearance occurring between teeth in the splined fitting section. As a result, it is possible to prevent the looseness in the rotating direction which occurs due to a slight clearance in the rotating direction, which is present between the outer shaft and the inner shaft.

However, in the operation of injecting a resin material into the slight clearance, the maintenance of precise molding conditions is required, and the margin of allowance in the setting of the molding conditions has been very strict.

SUMMARY OF THE INVENTION

In view of the above-described circumstances, it is an object of the present invention to provide a steering shaft which is telescopically contractible during an accident, such as a collision of a vehicle, and which makes it possible to prevent the occurrence of looseness of the inner shaft in the sliding coupling section by filling the sliding coupling section with a sliding resin member, and which allows the inner shaft to operate stably while guiding the axial movement of the shaft, thereby overcoming the above-described drawbacks of the conventional art.

To this end, in accordance with the present invention, there is provided a steering shaft comprising: an outer shaft having an inner splined portion; an inner shaft having a shaft portion and an outer splined portion which are arranged continuously along an axial direction; a retaining portion formed on at least one of the outer splined portion and the shaft portion; a sliding coupling section formed by a coupling portion of the outer shaft and a coupling portion of the inner shaft so as to allow the outer shaft and the inner shaft to be telescopically slidable in the axial direction relative to each other by means of splines; and a sliding resin member which is filled in a space formed in the sliding coupling section between an opening portion of the outer shaft and the retaining portion of the inner shaft.

In accordance with the above-described steering shaft, it is possible to obtain the following advantages. Namely, the movement in the rotating direction of the outer splined portion and the inner splined portion in the sliding coupling section due to a clearance in the rotating direction can be firmly suppressed by the sliding resin member which is provided in the opening portion of the outer shaft in the same way as in the conventional example.

Further, the sliding resin member is provided on the outer splined portion of the inner shaft, and the retaining portion is formed on at least one of the outer splined portion and the shaft portion, with the result that it is possible to prevent the rattling in the axial rotation of the sliding coupling section with a simple arrangement.

In addition, in the processing in which the sliding resin member is filled in the opening portion of the outer shaft of the steering shaft, it is possible to make substantially uniform the influx of the molten sliding resin member in a liquid form into the space between the opening portion of the outer shaft and the inner shaft, thereby improving the moldability.

Furthermore, it is possible to facilitate the management of various molding conditions, such as pressure, when the molten sliding resin member in the liquid form is poured. Additionally, it is possible to further stabilize and improve the slidability in the axially moving direction of the inner shaft.

The above and other objects, features and advantages of the present invention will become more apparent from the following detailed description of the invention when read in conjunction with the accompanying drawings.

BRIEF DESCRIPTION OF THE DRAWINGS

FIG. 1A is a side elevational view, partly in section, of a steering shaft in accordance with a first embodiment of the present invention;

FIG. 1B is a side elevational view, partly in section, of an essential portion of a sliding coupling section of the steering shaft in accordance with the first embodiment of the present invention;

FIG. 8 is a cross-sectional view illustrating a state in which the steering shaft is covered by an injecting mold half and a supporting mold half;

DESCRIPTION OF THE PREFERRED EMBODIMENTS

Referring now to the accompanying drawings, a description will be given of the present invention. As shown in FIGS. 1A and 1B, a steering shaft A is comprised of an outer shaft $A_1$ and an inner shaft $A_2$. The outer shaft $A_1$ and the inner shaft $A_2$ are fitted over and coupled to each other by means of splines along an axial direction, and this fitting coupling portion will be referred to as a sliding coupling section $A_3$.

The sliding coupling section $A_3$ is adopted to undergo sliding only during the application of an impact, and the steering shaft A is contracted in the axial direction and thereby absorbs the impact so as to dampen an axially thrusting force applied from a lower portion of a vehicle during a collision of the vehicle, e.g., a thrusting force applied from wheels against the steering shaft via a steering gear box.

In the sliding coupling section $A_3$, the outer shaft $A_1$ has an inner splined portion 2 formed on the inner peripheral side of an outer shaft member 1. On the other hand, the inner shaft $A_2$ is formed by a shaft portion 3 and an outer splined portion 4.

Figure 2A:
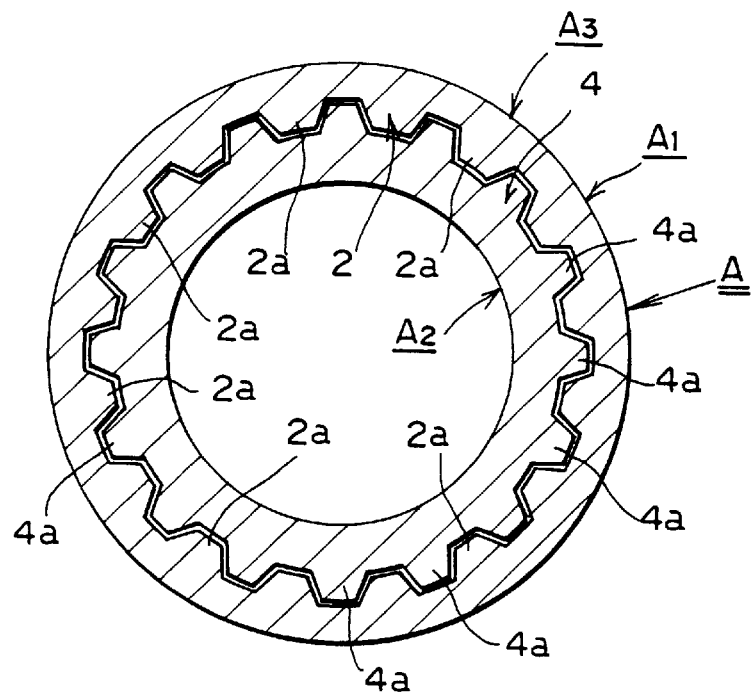
FIG. 2A is a cross-sectional view of FIG. 1B taken in the direction of arrows along line $X_1$—$X_1$.

Inner teeth 2a of the inner splined portion 2 and outer teeth 4a of the outer splined portion 4 are engaged with each other (see FIG. 2A). In the inner shaft $A_2$, the diameter of a dedendum circle of the outer splined portion 4 is formed to be larger than the outside diameter of the shaft portion 3.

In the inner shaft $A_2$, a retaining portion 5 is formed on either the outer splined portion 4 and the shaft portion 3. The retaining portion 5 is retained at a sliding resin member 6 filled in a gap between an opening portion of the outer shaft $A_1$ and the outer splined portion 4 of the inner shaft $A_2$ so as to suppress the relative movement of the outer shaft $A_1$ and the inner shaft $A_2$ in the axially rotating direction, i.e., in the circumferential direction.

In the present invention, there are various embodiments depending on the type of the retaining portion 5.

First, a first embodiment of the present invention is shown in FIGS. 1 to 6. In the retaining portion 5, elongated grooves 5a are each formed in such a manner as to extend along the axial direction from a tooth bottom 4b toward the shaft portion 3 side (see FIGS. 1B, 3A, 3B, and 4).

The diameter of the dedendum circle at the tooth bottoms 4b of the outer splined portion 4 is formed to be larger than the outside diameter of the shaft portion 3. Further, a step is formed between the bottom surface of the groove 5a and the tooth bottom 4b. That is, the grooves 5a are formed in the axial direction in the shaft portion 3 having a smaller diameter than the diameter of the dedendum circle of the outer splined portion 4 (see FIGS. 3A, 3B, and 4B). In addition, there is a type in which the bottom of each groove 5a and the tooth bottom 4b of the outer splined portion 4 are made flush (see FIGS. 6A and 6B).

The axial length of the grooves 5a formed in the shaft portion 3 is set to be the length of the stroke by which the inner shaft $A_2$ moves in the axial direction during an impact, or the axial length of the grooves 5a is set to be identical to the overall length of the shaft portion 3.

The sliding resin member 6 which is filled in an opening portion 1a in the outer shaft $A_1$ enters the space formed by the inner splined portion 2 of the outer shaft $A_1$, the outer splined portion 4 of the inner shaft $A_2$, and the retaining portion 5 formed on the inner shaft $A_2$. The sliding resin member 6 serves to prevent the looseness of the outer shaft $A_1$ and the inner shaft $A_2$ in the axially rotating direction in the sliding coupling section $A_3$, and securely holds this state.

It should be noted that the opening portion 1a in the outer shaft $A_1$ is the opening portion of the outer shaft $A_1$ into which the inner shaft $A_2$ is inserted in the axial direction.

Figure 2B:
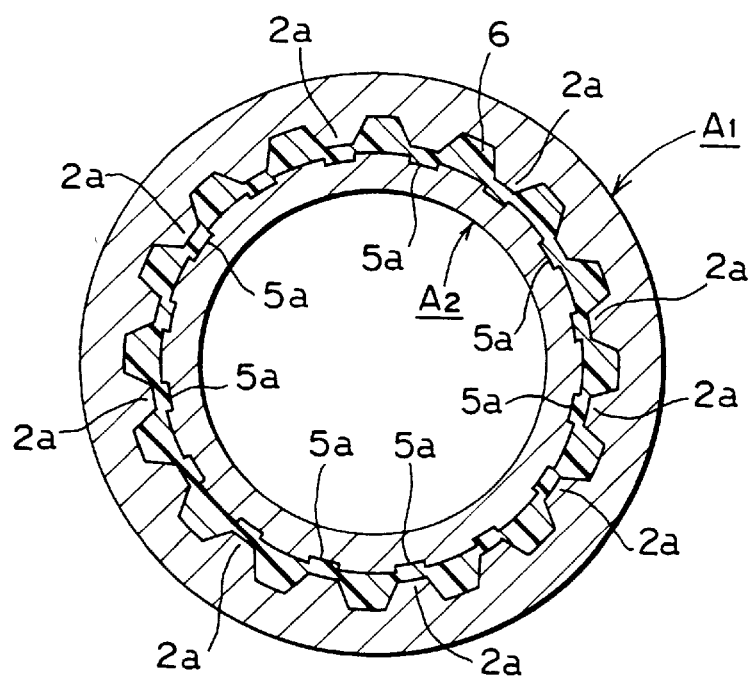
FIG. 2B is a cross-sectional view of FIG. 1B taken in the direction of arrows along line $X_2$—$X_2$.

As a result, the structure provided is such that the clearance in the rotating direction (inter alia, the clearance between each outer tooth 4a and each inner tooth 2a located adjacent thereto) is provided in the sliding coupling section $A_3$ of the outer shaft $A_1$ and the inner shaft $A_2$, and the looseness in the rotating direction of the inner shaft $A_2$ due to the clearance can be securely fixed by the sliding resin member 6 while favorably securing the axial slidability of the splines (see FIGS. 2A and 2B).

In addition, when the inner shaft $A_2$ moves by the length of the stroke in the axial direction by means of the grooves 5a during a collision, the inner shaft $A_2$ is capable of sliding smoothly.

For example, in a shaft structure in which the axially innermost side of the inner periphery of the outer shaft $A_1$ is formed as a nonsplined portion, and the outer shaft $A_1$ has a range (nonfitting range) in which the outer shaft $A_1$ is not spline-fitted to the outer splined portion 4 of the inner shaft $A_2$, the spline-fitted range becomes small as the inner shaft $A_2$ moves in the axial direction.

On the other hand, however, the sliding resin member 6 provided in the opening portion 1a of the outer shaft $A_1$ and the grooves 5a of the inner shaft $A_2$ constantly continues to maintain a meshed state in the opening portion 1a, so that the meshing between the sliding resin member 6 and the grooves 5a is able to further stabilize the slidability in the axial direction.

In the first embodiment of the present invention, as described above, the retaining portion 5 is constituted by the grooves 5a, and each groove 5a is formed in such a manner as to extend in the axial direction from the tooth bottom of the outer splined portion 4 and form a substantially splined shape. For this reason, the sliding resin member 6 enters the grooves 5a, thereby making it possible to very securely fix the coupling section of the outer shaft $A_1$ and the inner shaft $A_2$.

Figure 7A:
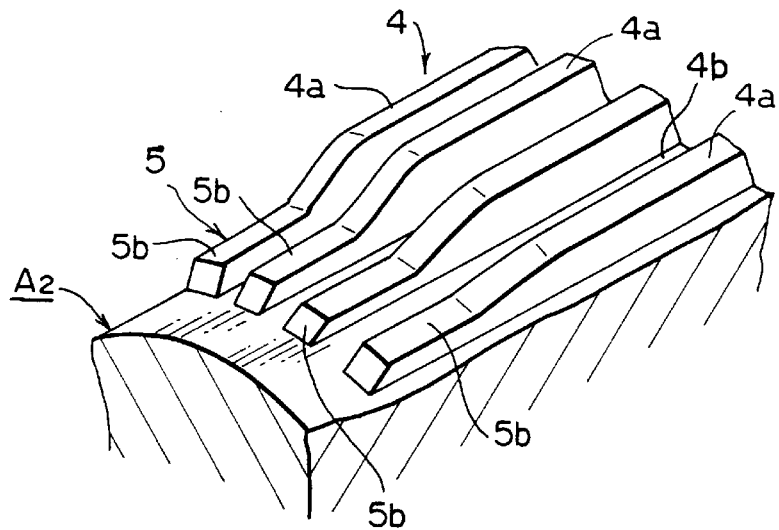
FIG. 7A is a perspective view of an essential portion of a second embodiment of the present invention in which a retaining portion is formed tooth portions.
Figure 7B:
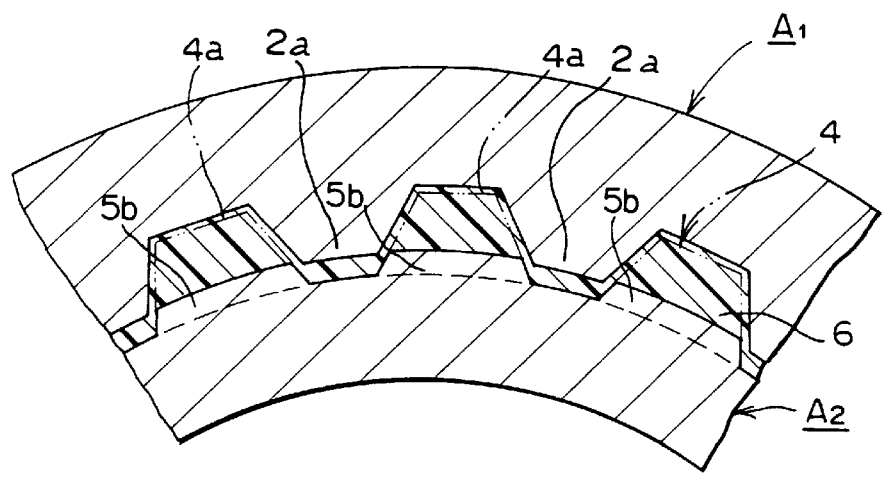
FIG. 7B is a vertical front cross-sectional view of an essential portion of the sliding coupling section of the steering shaft in accordance with the second embodiment in which the retaining portion is formed as the tooth portions.
Figure 7C:
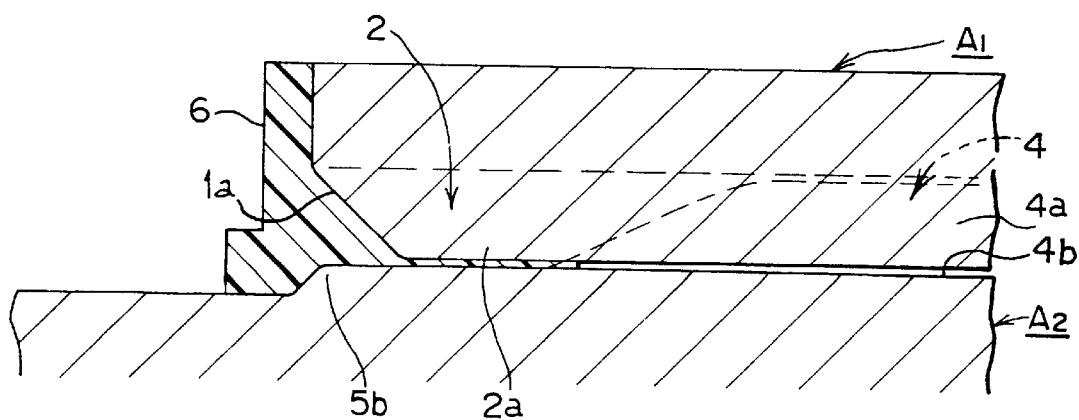
FIG. 7C is a vertical side cross-sectional view of the essential portion of the sliding coupling section of the steering shaft in accordance with the second embodiment in which the retaining portion is formed as the tooth portions.

Referring next to FIGS. 7A to 7C, a description will be given of a second embodiment of the present invention wherein the retaining portion 5 is formed as tooth portions 5b.

The tooth portions 5b are each configured such that the diameter of a dedendum circle thereof is made identical to that of the outer splined portion 4, and the diameter of an addendum circle thereof is made smaller than that of the outer splined portion 4 at an axial end portion of the outer splined portion 4. Specifically, the tooth portions 5b are formed in such a manner as to extend toward the shaft portion 3 from the axial end portion of the outer splined portion 4 formed on the inner shaft $A_2$ (see FIG. 7A).

The diameter of the dedendum circle of the tooth portions 5b is identical to that of the outer splined portion 4, and the diameter of the addendum circle thereof is smaller than that of the outer splined portion 4. Since the tooth portions 5b can be formed integrally with the outer splined portion 4 along the axial direction, the forming work thereof is facilitated.

Since the diameter of the addendum circle of the tooth portions 5b is made smaller than that of the outer splined portion 4, the operation of providing the sliding resin member 6 at the opening portion 1a between the outer shaft $A_1$ and the inner shaft $A_2$ is facilitated.

Further, if the height of the tooth portions 5b is set such that the diameter of the addendum circle of the tooth portions 5b is substantially identical to that of the inner splined portion 2 of the outer shaft $A_1$, or smaller than the same to provide a slight gap therebetween, the sliding resin member 6 can be held securely, and this arrangement is more preferable (see FIG. 7C).

In addition, an annular stepped portion may be provided on the shaft portion 3 to slightly lower the outer surface of the shaft portion 3 from the tooth bottoms of the tooth portions 5b such that the diameter of the shaft portion 3 is made smaller than the diameter of the dedendum circle of the tooth portions 5b. If this arrangement is adopted, since an appropriate gap is produced between the outer surface of the shaft portion 3 having a smaller diameter and the sliding resin member 6 in the relative sliding operation in the axial direction between the outer shaft $A_1$ and the inner shaft $A_2$ during an impact, it is possible to reduce the sliding resistance and improve the slidability.

Thus, the sliding resin member 6 provided in the opening portion 1a of the outer shaft $A_1$ is securely held by the inner splined portion 2 of the outer shaft $A_1$ and the tooth portions 5b of the inner shaft $A_2$, and even if there is a gap in the rotating direction of the splines in the sliding coupling section $A_3$, the outer shaft $A_1$ and the inner shaft $A_2$ can be held securely relative to each other.

Meanwhile, since the tooth portions 5b are formed along the outer splined portion 4 in the sliding $A_2$ section $A_3$, the relative slidability of the outer shaft $A_1$ and the inner shaft $A_2$ in the axial direction can be improved, and the structure can be very simple by merely forming the tooth portions 5b at the portion where the sliding resin member 6 is fitted.

As described above, the retaining portion 5 in accordance with the second embodiment is constituted by the tooth portions 5b, and since the structure in which the tooth portions 5b are merely formed is adopted, the structure is made simple, and the retention of the sliding resin member 6 in the opening portion 1a is made very firm.

As an alternative method of forming the tooth portions 5b in accordance with the second embodiment, the tooth portions 5b having a lower height than the outer teeth 4a of the outer splined portion 4 may be simply formed by effecting the machining, such as the circumferential cutting, of the axial end portion of the outer splined portion 4 after the formation of the outer splined portion 4. Thus, it is possible to form the retaining portion 5 in such a manner as to extend from the tooth bottoms of the outer splined portion 4 along the axial direction of the shaft portion 3, such that the height of the tooth portions 5b is made lower than the height of the teeth of the outer splined portion 4.

In addition, the shaft portion 3 may be formed such that its outer peripheral surface is lower than the tooth bottoms of the retaining portion 5. In other words, the outside diameter of the shaft portion 3 may be made smaller than the diameter of the dedendum circle of the tooth portions 5b.

Figure 13A:
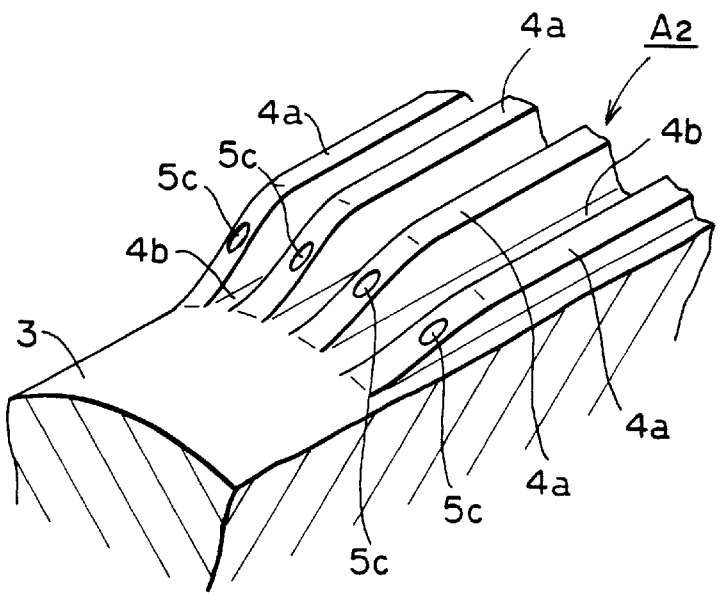
FIG. 13A is a perspective view of the retaining portion in accordance with a third embodiment of the present invention.
Figure 13B:
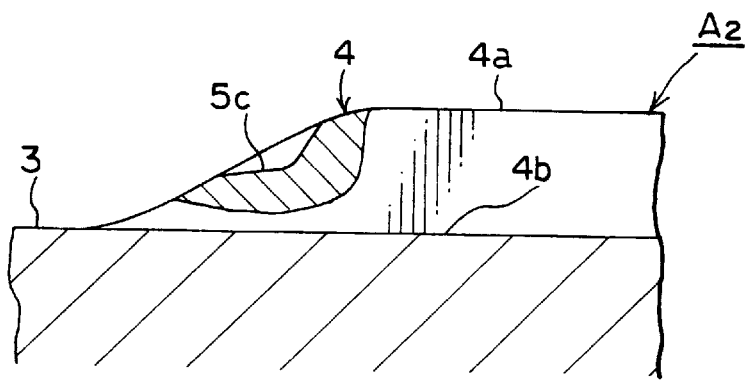
FIG. 13B is a side elevational view, partly in section, of the retaining portion in accordance with the third embodiment of the present invention.
Figure 13C:
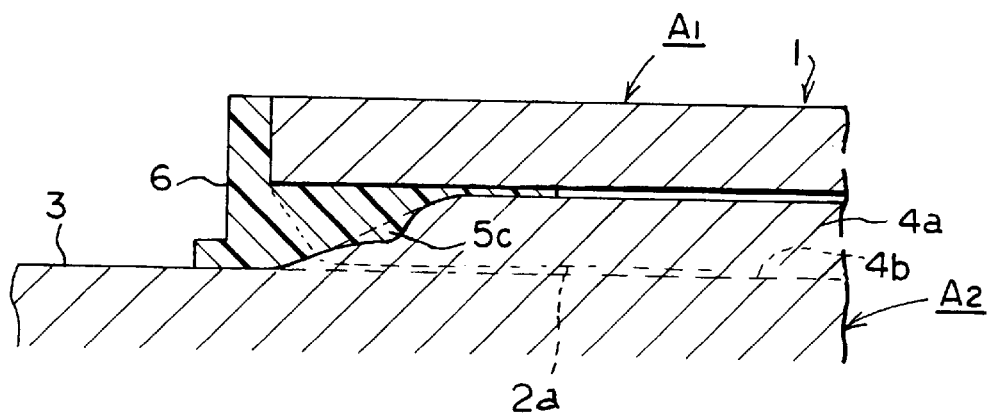
FIG. 13C is a vertical side cross-sectional view of an essential portion of the sliding coupling section of the steering shaft in which the retaining portion in accordance with the third embodiment is adopted.

Referring next to FIGS. 13A to 13C, a description will be given of a third embodiment of the present invention wherein the retaining portion 5 is formed as concave portions 5c in the respective outer teeth 4a. Specifically, the structure provided is such that concave portions are respectively formed in slanted end faces of the outer teeth 4a on the shaft portion 3 side. As the aforementioned sliding resin member 6 enters the concave portions 5c, the sliding resin member 6 is retained by the retaining portion 5 (see FIG. 13C).

Thus, in the retaining portion 5 in accordance with the third embodiment, the forming operation can be effected very simply by forming the concave portions 5c, which is an advantage in fabrication.

Figure 14A:
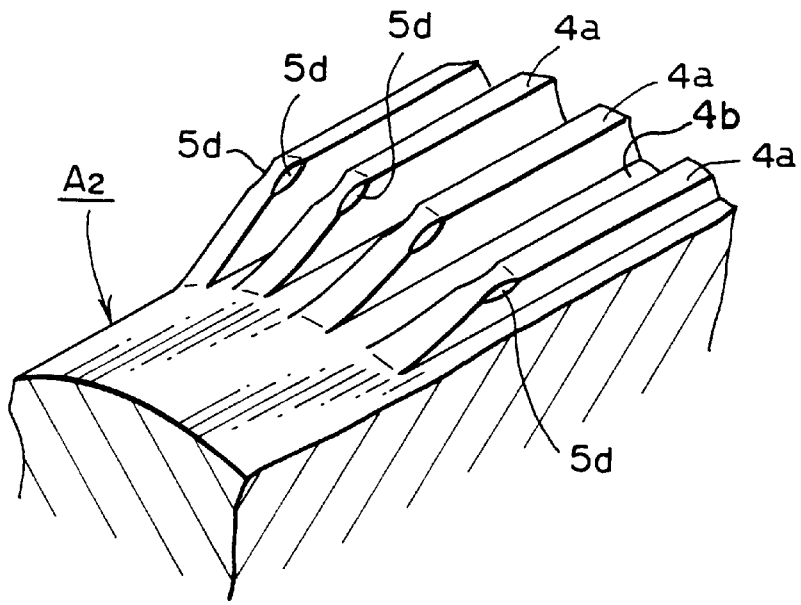
FIG. 14A is a perspective view of the retaining portion in accordance with a fourth embodiment of the present invention.
Figure 14B:
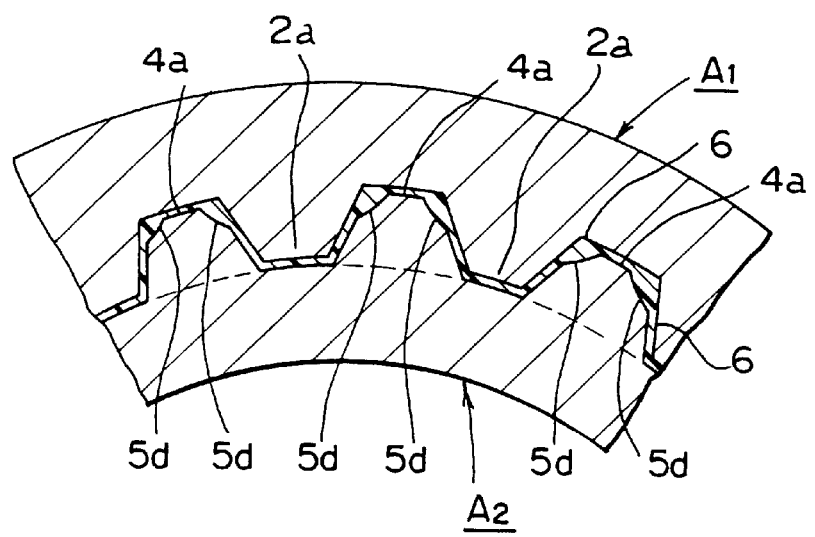
FIG. 14B is a cross-sectional view of the retaining portion in accordance with the fourth embodiment of the present invention.

As a fourth embodiment of the present invention, the retaining portion 5 is formed as corner retaining surfaces 5d on the respective outer teeth 4a, as shown in FIGS. 14A and 14B. Specifically, the corner retaining surfaces 5d are formed as slanted surface portions at corner portions of the outer teeth 4a on the shaft portion 3 side.

Although, in this illustrated example, the corner retaining surfaces 5d are formed to be flat, the corner retaining surfaces 5d may be substantially flat, and may be formed in a concave shape. The sliding resin member 6 which is filled between the inner splined portion 2 and the outer splined portion 4 is also filled at the corder retaining surfaces 5d (see FIG. 14B).

In this embodiment, in the same way as the other embodiments, in the event that the inner shaft $A_2$ is slightly bent with respect to the axial direction of the outer shaft $A_1$ when the steering shaft A undergoes axial contraction upon application thereto of an impact of a fixed level or more, the inner shaft $A_2$ is able to slide favorably by virtue of the sliding resin member 6 filled between the inner splined portion 2 of the outer shaft $A_1$ on the opening portion 1a side and the end portion of the outer splined portion 4 of the inner shaft $A_2$ on the shaft portion 3 side.

In addition, the inner shaft $A_2$ can be prevented from biting into the outer shaft $A_1$.

Figure 15A:
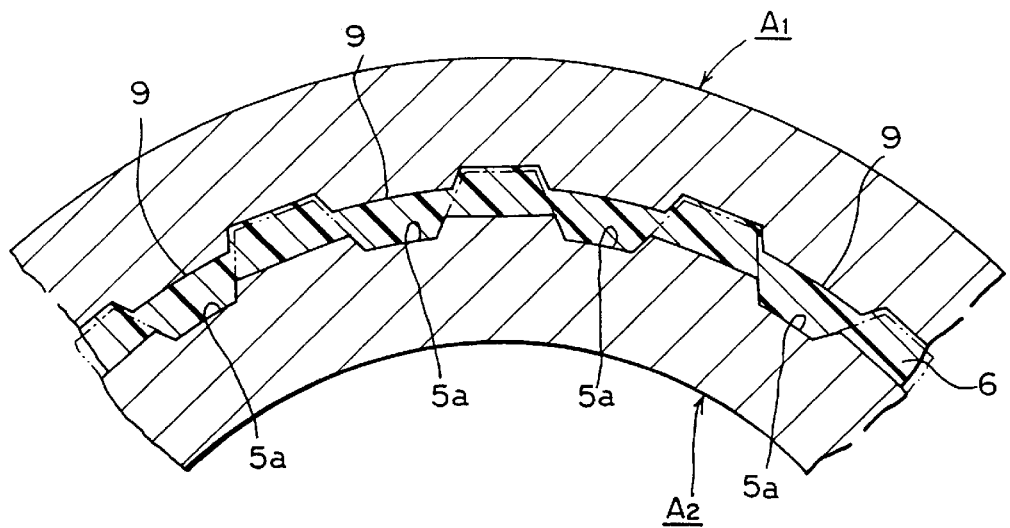
FIG. 15A is a cross-sectional view of an essential portion of the sliding coupling section in which outer-side tooth portions are formed on the opening portion side of the outer shaft, and grooves are formed on the inner shaft.
Figure 15B:
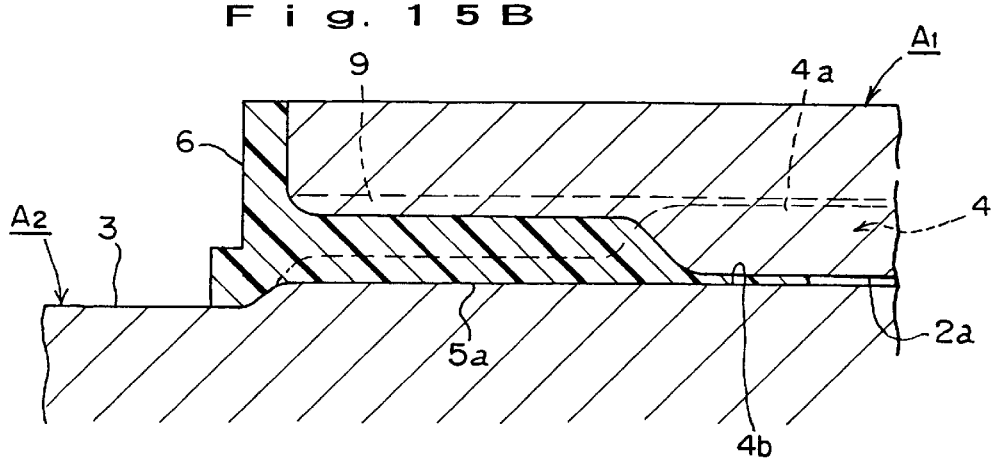
FIG. 15B is a vertical side cross-sectional view of the essential portion of the sliding coupling section in which the outer-side tooth portions are formed on the opening portion side of the outer shaft.

Referring next to FIGS. 15A and 15B, a description will be given of a fifth embodiment of the present invention wherein outer-side tooth portions 9 corresponding to the grooves 5a formed in the inner shaft $A_2$ are formed on the opening portion 1a side of the outer shaft $A_1$.

Specifically, the outer-side tooth portions 9 are formed on the inner teeth 2a of the inner splined portion 2 on the opening portion 1a side in the outer shaft $A_1$. The height of the outerside tooth portions 9 is set to be smaller than the height of the inner teeth 2a (see FIG. 15B).

In this type, since a large space for forming the sliding resin member 6 in the opening portion 1a of the outer shaft $A_1$ can be provided, the sliding resin member 6 is formed with a large thickness, thereby making it possible to enhance the fixing strength of the sliding resin member 6.

In addition, since the gaps in the circumferential direction become large, the fluidity of the resin material for molding the sliding resin member 6 in the circumferential direction improves, thereby making it possible to improve the moldability.

It should be noted that the length of the outer-side tooth portions 9 extending from the opening portion 1a of the outer shaft $A_1$ may be selected, as required, relative to the retaining portion 5 constituted by the grooves 5a. Even in such a case, the resin material for forming the sliding resin member 6 is able to easily flow in the circumferential direction.

Further, as compared with the type in which the outer-side tooth portions 9 are not formed on the inner splined portion 2 of the outer shaft $A_1$, it is possible to further improve the moldability of the sliding resin member 6.

Figure 15C:
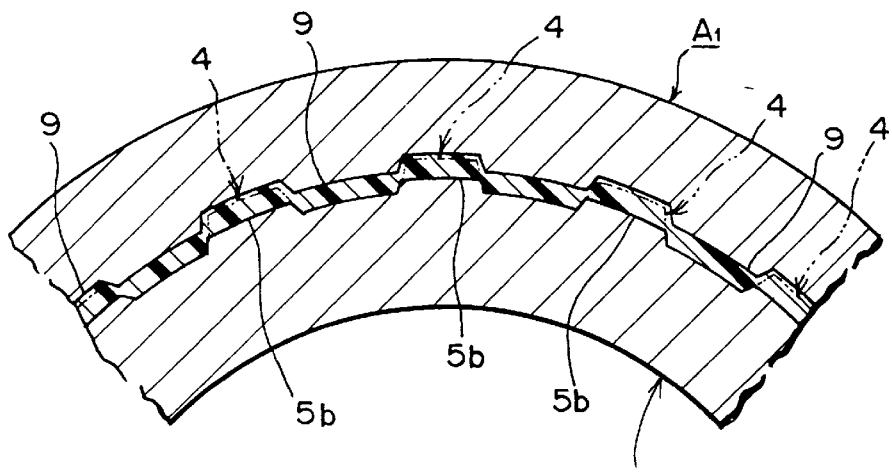
FIG. 15C is a cross-sectional view of an essential portion of the sliding coupling section in which the outer-side tooth portions are formed on the opening portion side of the outer shaft, and tooth portions ,are formed on the inner shaft.

In addition, as a modification of the fifth embodiment, it is possible to adopt a combination in which the retaining portion 5 is formed as the tooth portions 5b on the inner shaft $A_2$ side in correspondence with the outer-side tooth portions 9 in the opening portion 1a of the outer shaft$A_1$ (see FIG. 15C). In this modification, the sliding resin member 6 in the opening portion 1a can be firmly secured by the outer-side tooth portions 9 and the tooth portions 5b.

Figure 3A:
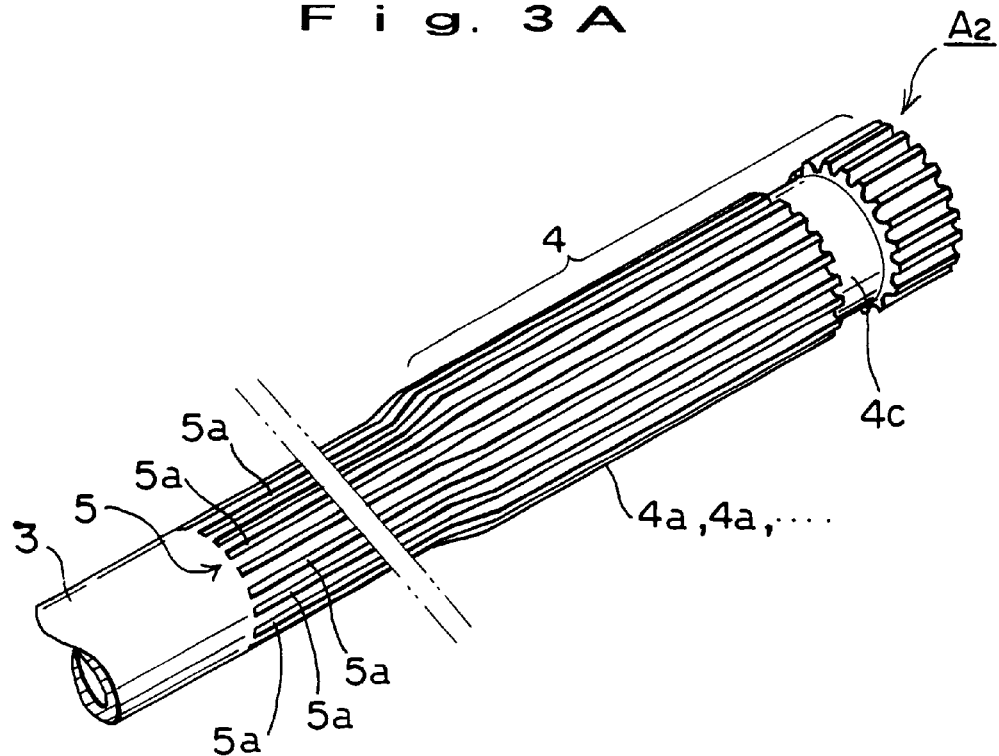
FIG. 3A is a perspective view of an inner shaft.
Figure 3B:
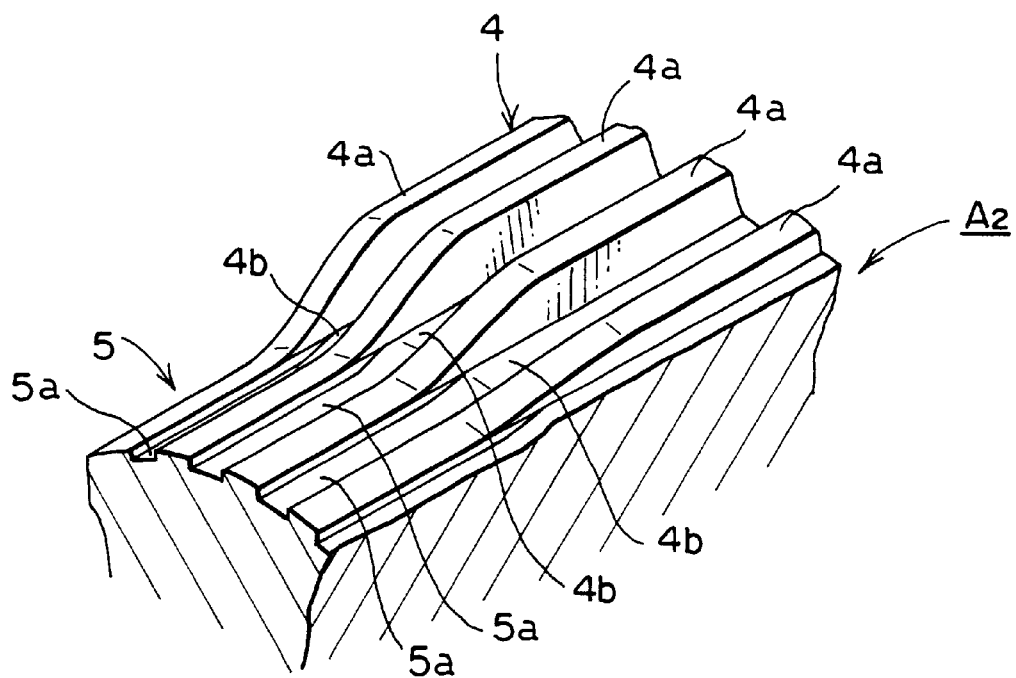
FIG. 3B is an enlarged perspective view of an essential portion of the inner shaft.
Figure 4A:
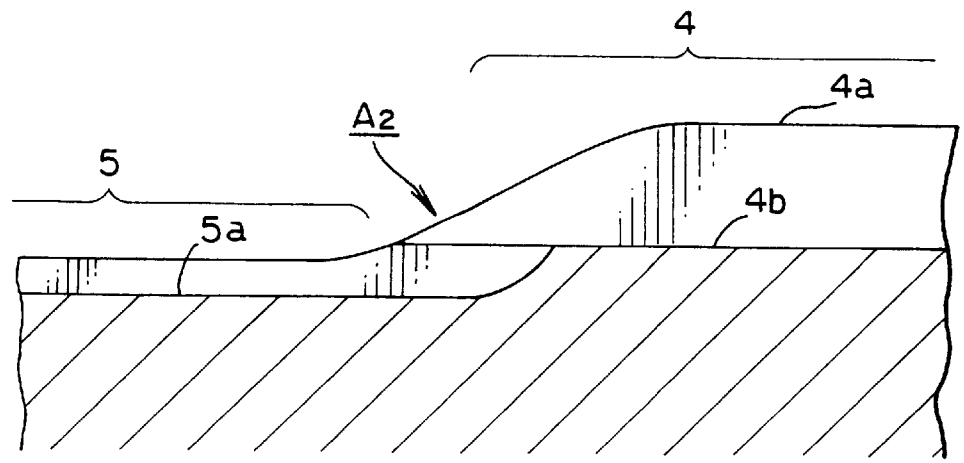
FIG. 4A is a cross-sectional view of the essential portion of the inner shaft.
Figure 4B:
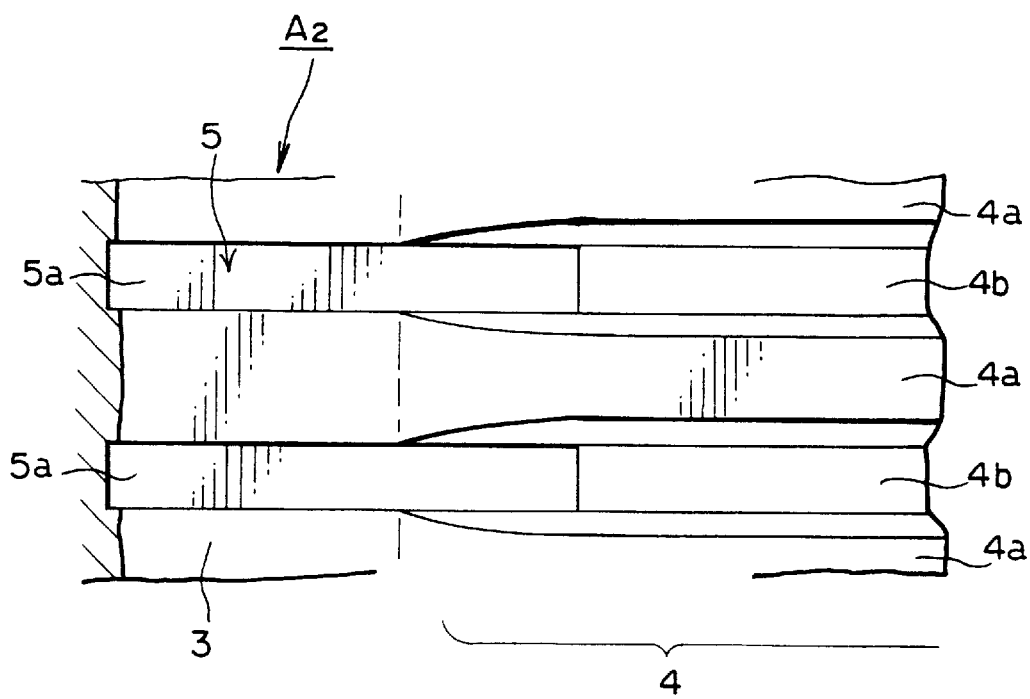
FIG. 4B is a plan view of the essential portion of the inner shaft.

In the foregoing first to fifth embodiments, as shown in FIG. 3A, an annular fixing groove 4c is formed on a peripheral surface of the outer splined portion 4 of the inner shaft $A_2$ on the opposite side to and at an appropriate interval from the portion where the sliding resin member 6 is formed.

Then, resin fixing portions 8 having the shape of shear pins are formed by means of a fixing resin material 7 which is injected from an injection hole 1b in the outer shaft $A_1$ (see FIG. 1B). By virtue of these resin fixing portions 8, the sliding coupling section $A_3$ Of the outer shaft $A_1$ and the inner shaft $A_2$ does not undergo sliding operation until an impact of a fixed level or more is applied thereto.

Figure 9:
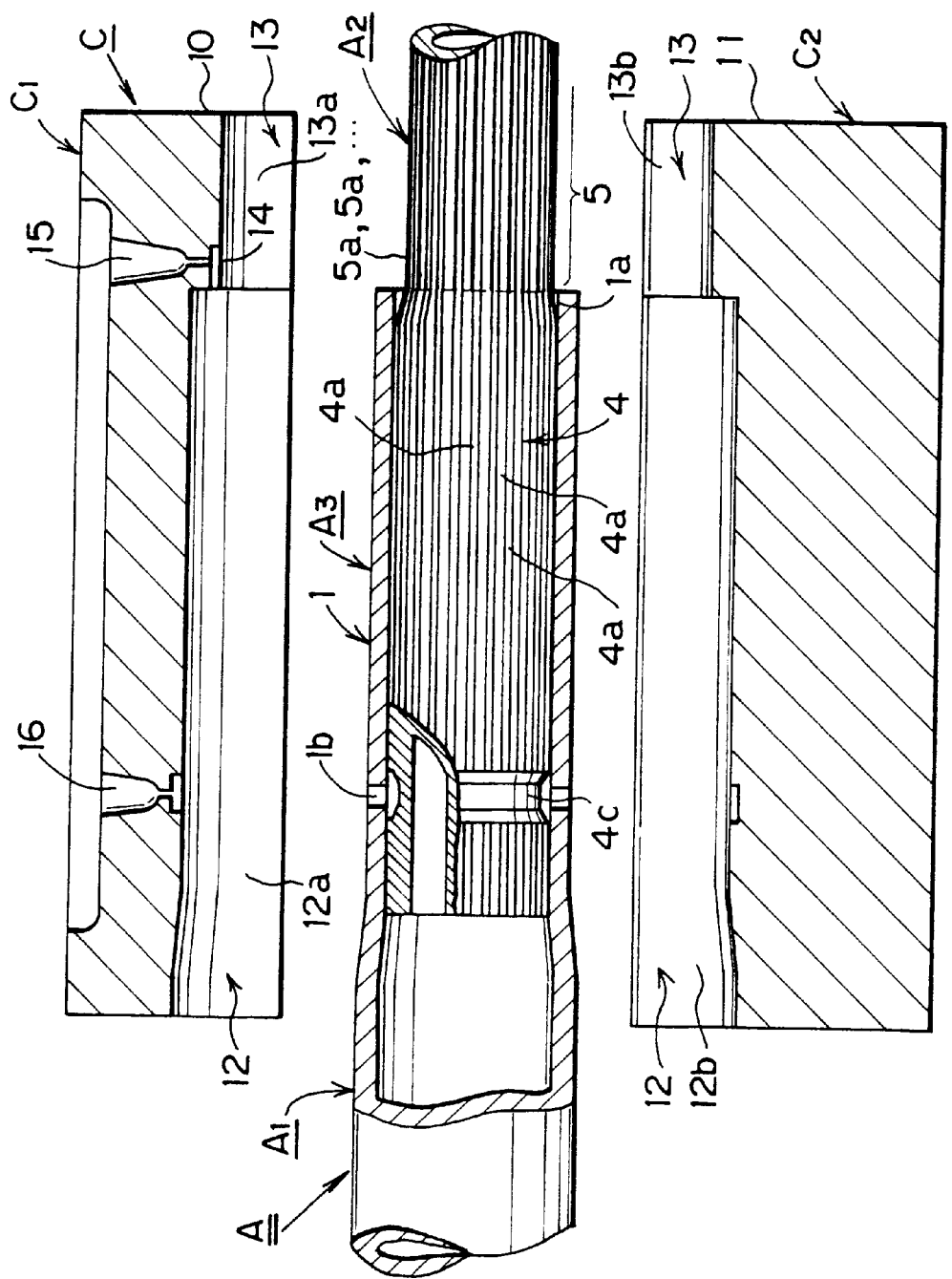
FIG. 9 is a cross-sectional view illustrating the injecting mold half and the supporting mold half.

Next, a description will be given of a method of forming the sliding coupling section $A_3$ of the steering shaft A. As shown in FIGS. 8 and 9, a mold C is comprised of an injecting mold half $C_1$ and a supporting mold half $C_2$. The steering shaft A comprised of the outer shaft $A_1$ and the inner shaft $A_2$ is placed between the injecting mold half $C_1$ and the supporting mold half $C_2$. At this time, the inner splined portion 2 of the outer shaft $A_1$ and the outer splined portion 4 of the inner shaft $A_2$ are slidably coupled to each other.

The mold C is provided with an outer-shaft accommodating portion 12 for accommodating the outer shaft $A_1$ of the steering shaft A and an inner-shaft accommodating portion 13 for accommodating the inner shaft $A_2$. A molten-resin injection guide portion 14 which communicates with the opening portion 1a of the outer shaft $A_1$ is formed on the inner-shaft accommodating portion 13 side.

The outer-shaft accommodating portion 12 and the inner-shaft accommodating portion 13 are formed in both the injecting mold half $C_1$ and the supporting mold half $C_2$. On the injecting mold half $C_1$ side, an injection-side outer-shaft accommodating portion 12a and an injection-side inner-shaft accommodating portion 13a are formed in a mold body 10. Similarly, on the supporting mold half $C_2$ side, a supporting-side outer-shaft accommodating portion 12b and a supporting-side inner-shaft accommodating portion 13b are formed in a supporting mold body 11.

Figure 10A:
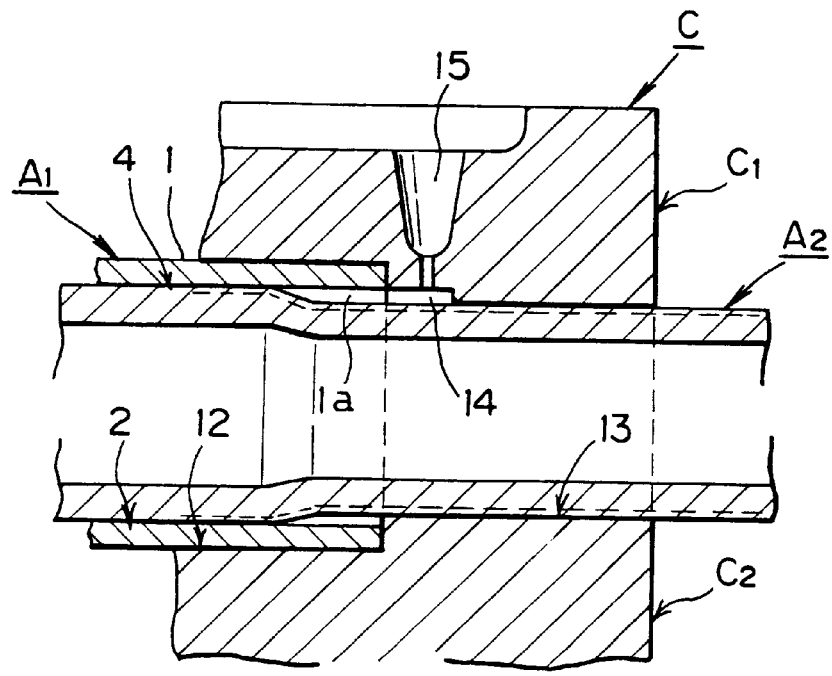
FIG. 10A is a cross-sectional view illustrating a state in which an opening portion of the outer shaft and a molten-resin injection guide portion communicate with each other.
Figure 10B:
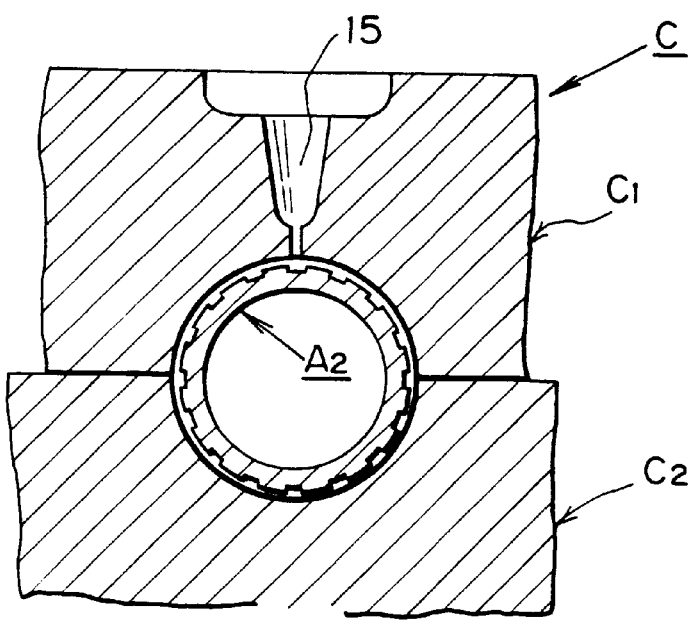
FIG. 10B is cross-sectional view of the injecting mold half, the supporting mold half, and the inner shaft.
Figure 11A:
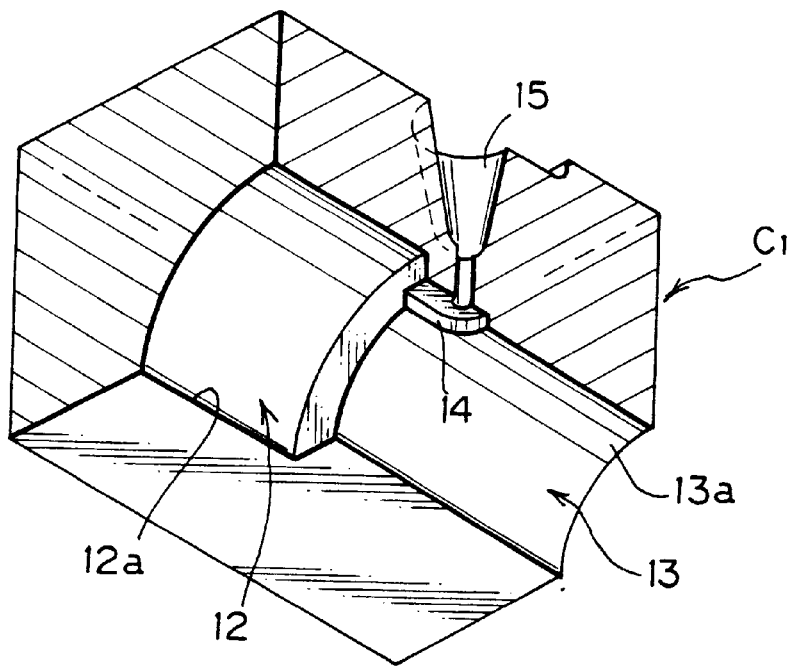
FIG. 11A is a perspective view of an essential portion of the injecting mold half.
Figure 11B:
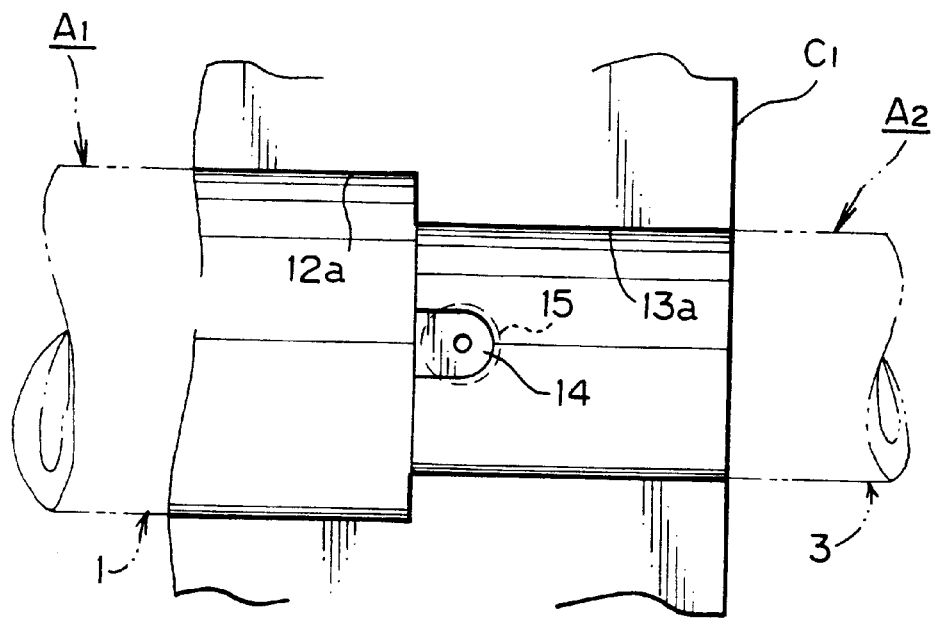
FIG. 11B is a plan view of the essential portion of the injecting mold half.

The outer-shaft accommodating portion 12 and the inner-shaft accommodating portion 13 are distinguished from each other by a stepped portion where the size of the shaft changes. The molten-resin injection guide portion 14 is formed on the injection-side inner-shaft accommodating portion 13a side of the injecting mold half, and the molten-resin injection guide portion 14 is further connected to a molten-resin injection guide port 15 (see FIGS. 10A and 11A). The molten-resin injection guide port 15 is a port through which the molten resin material is injected from outside the injecting mold half $C_1$.

Figure 12A:
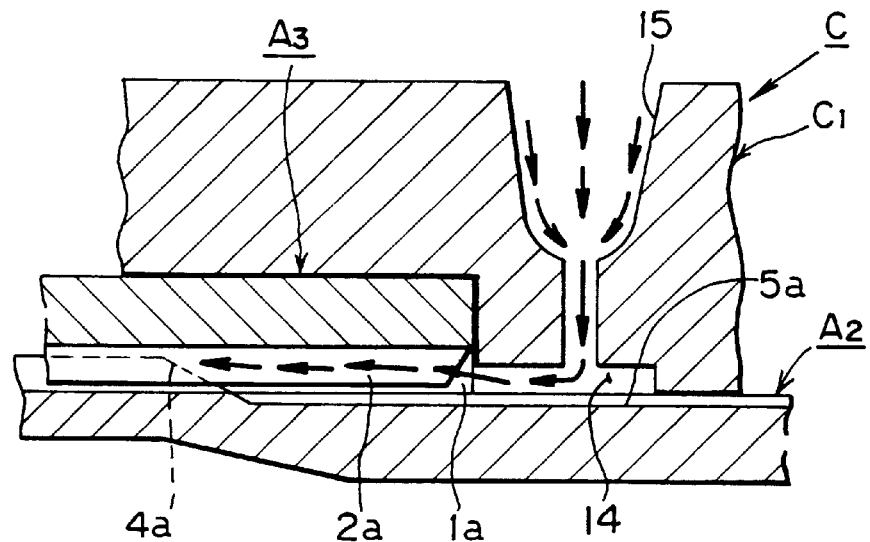
FIG. 12A is a cross-sectional view illustrating a state in which the opening portion of the outer shaft and the molten-resin injection guide portion communicate with each other.
Figure 12B:
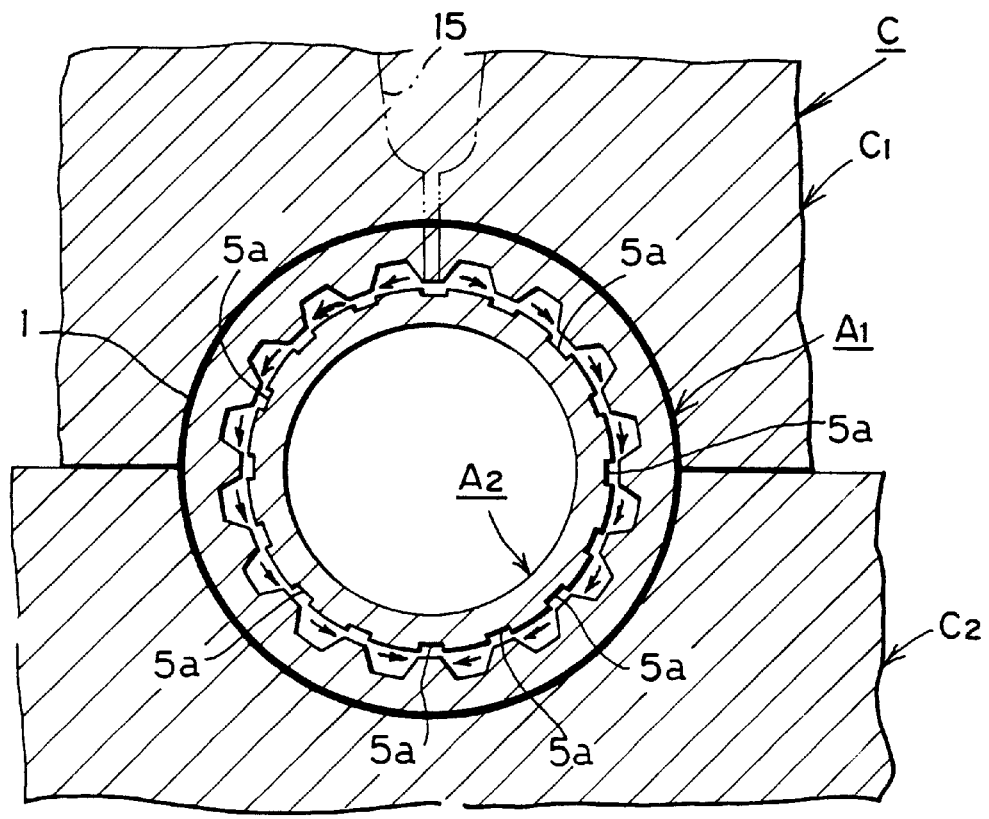
FIG. 12B is cross-sectional view of the injecting mold half, the supporting mold half, the inner shaft, and the outer shaft.

The molten-resin injection guide port 15 is structured in such a manner as to communicate with the opening portion 1a of the outer shaft $A_1$ when the steering shaft A is accommodated inside the mold C, and when the molten resin material is injected through the molten-resin injection guide port 15, the molten resin material passes through the molten-resin injection guide portion 14 and enters the interior of the opening portion 1a of the outer shaft $A_1$ (see FIGS. 12A and 12B). A molten-resin injecting portion 16 for injecting the molten resin material for forming the fixing resin material 7 is formed in the injecting mold half $C_1$.

Figure 5A:
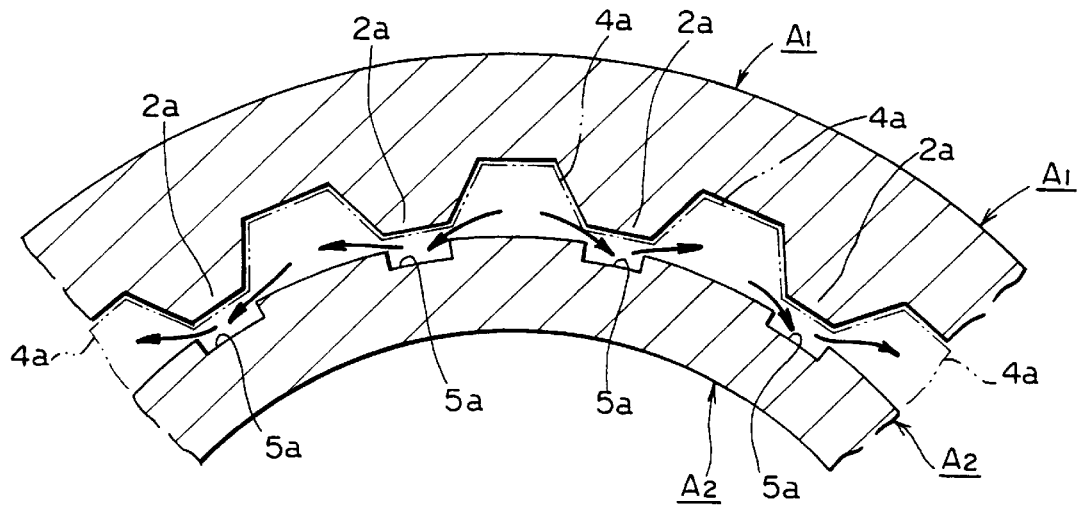
FIG. 5A is a cross-sectional view of an essential portion of the sliding coupling section of the steering shaft.
Figure 5B:
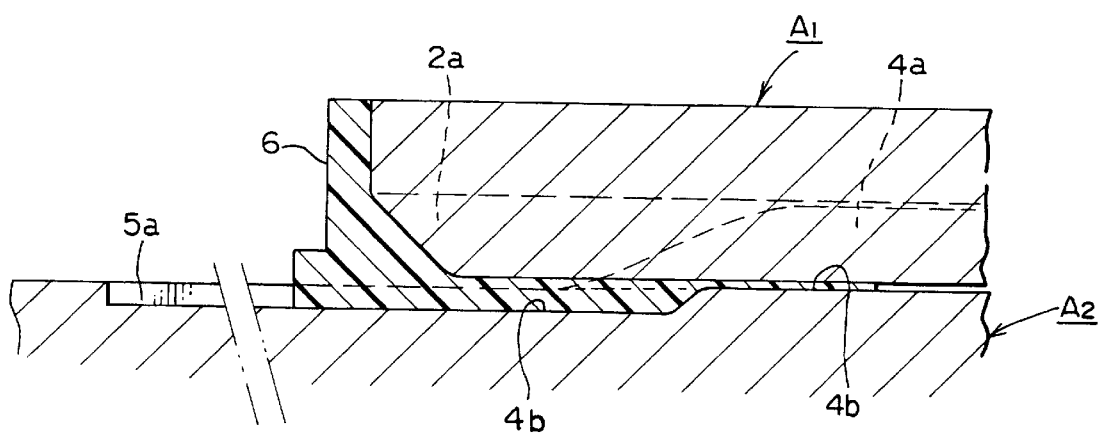
FIG. 5B is a vertical side cross-sectional view of the essential portion of the sliding coupling section of the steering shaft.
Figure 6A:
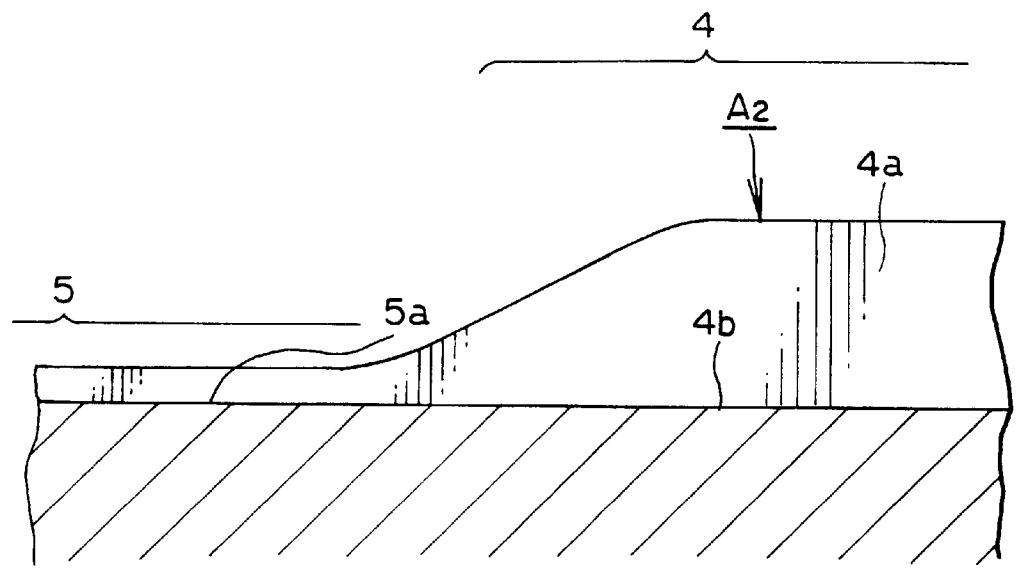
FIG. 6A is a cross-sectional view of an essential portion of an inner shaft of another type in accordance with the present invention.
Figure 6B:
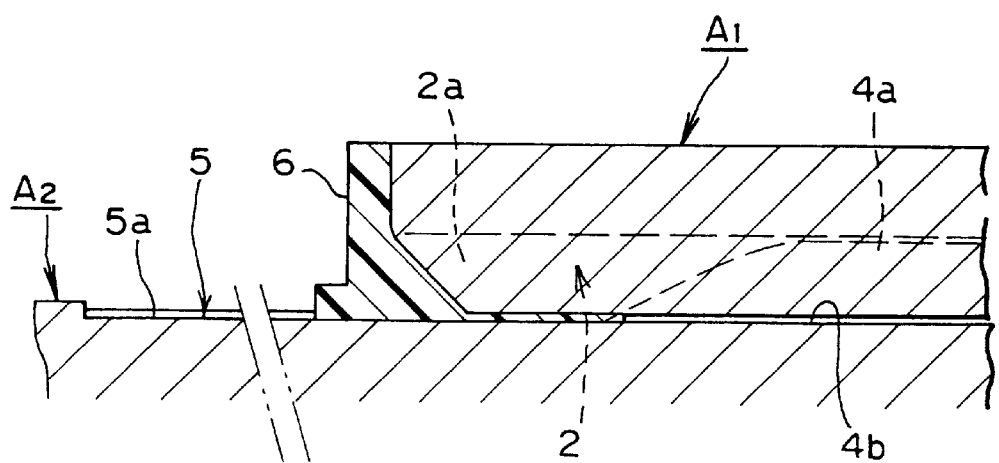
FIG. 6B is a vertical side cross-sectional view of the essential portion of the sliding coupling section of still another type in accordance with the present invention.

The molten resin material, which flows along the molten-resin injection guide portion 14 and flows into the space between the outer shaft $A_1$ and the inner shaft $A_2$ through the opening portion 1a, further advances in such a manner as to fill the gap between the inner shaft $A_2$ and the outer shaft $A_1$, as shown in FIG. 5.

At this time, as shown in FIG. 8, the sliding coupling section $A_3$ of the outer shaft $A_1$ and the inner shaft $A_2$ is fixed by the injecting mold half $C_1$ and the supporting mold half $C_2$, and the center of the inner shaft $A_2$ and the center of the outer shaft $A_1$ are aligned (or substantially aligned) with each other. For this reason, the inner shaft $A_2$ can be supported in a neutral state in such a manner as to be coaxially arranged with respect to the outer shaft $A_1$.

Figure 16A:
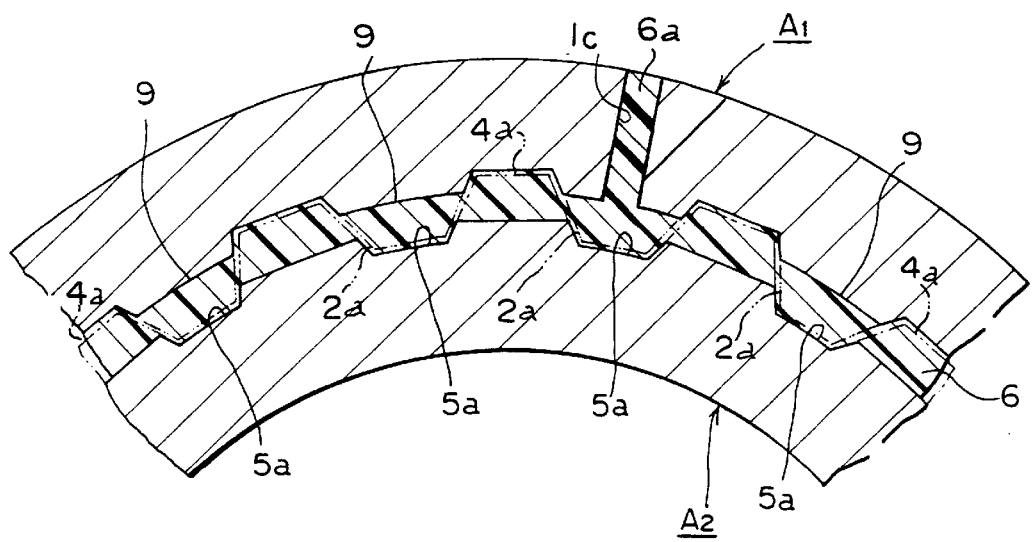
FIG. 16A is a vertical front cross-sectional view of a further embodiment in which a retaining projection is formed on the sliding resin member and is retained in a retaining through hole formed in the outer shaft.
Figure 16B:
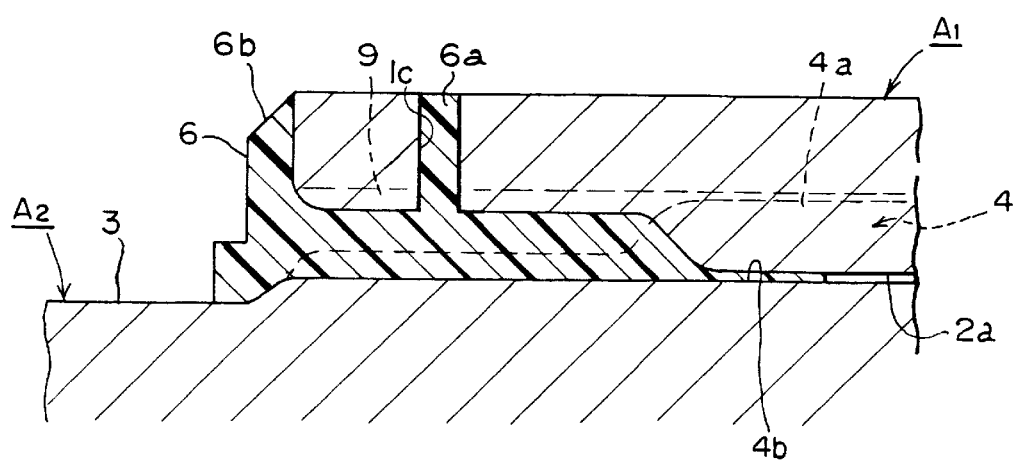
FIG. 16B is a vertical front cross-sectional view of a still further embodiment in which the retaining projection is formed on the sliding resin member and is retained in the retaining through hole formed in the outer shaft, and a chamfered portion is formed at a distal end of the sliding resin member.

Incidentally, FIGS. 16A and 16B shows another embodiment in which a retaining projection 6a is formed on the outer peripheral side of the sliding resin member 6. The retaining projection 6a serves to prevent the sliding resin member 6 from coming off the opening portion 1a of the sliding coupling section $A_3$.

The sliding resin member 6 is formed in at least one portion at an appropriate position on the teeth and tooth bottoms of the inner splined portion 2.

A retaining through hole 1c is formed in an opening portion 1a of the outer shaft $A_1$ in such a manner as to extend in a direction perpendicular to the axial direction, and the uncured sliding resin member 6 which is filled is allowed to flow into the retaining through hole 1c, and is subsequently cured to form the retaining projection 6a.

The retaining through hole 1c may be formed in the retaining portion 5 which is formed on the inner shaft $A_2$.

Furthermore, in accordance with another embodiment, a chamfered portion 6b may be formed at a circumferential corner portion of the sliding resin member 6 provided at the opening portion 1a of the sliding coupling section $A_3$ (see FIG. 16B).

Since the chamfered portion 6b is formed, in a case where a separate attaching tool or the like is fitted over the outer side of the outer shaft $A_1$ in the axial direction, the fitting operation can be effected smoothly and easily by virtue of the chamfered portion 6b, thereby making it possible to improve the assembling efficiency.

What is claimed is:

1. A steering shaft, comprising:
   an outer shaft having axially extending inner splines formed around an inner surface thereof, the inner splines including teeth;
   an axially directed inner shaft including
      a splined portion having axially extending outer splines formed around an outer surface thereof, and
      a shaft portion including a retaining portion having axially extending grooves formed around an outer surface of the shaft portion;
   a sliding coupling section formed by a coupling portion of the outer shaft and a coupling portion of the inner shaft so as to allow the outer shaft and the inner shaft to be telescopically slidable in the axial direction relative to each other by means of the inner and outer splines; and
   a sliding resin member filling a space formed in the sliding coupling section between an opening portion of the outer shaft and the retaining portion of the inner shaft, the sliding resin member respectively including inner and outer peripheries sized and arranged to engage and interlock with the grooves of the inner shaft and the teeth of the inner splines of the outer shaft, to thereby prevent rotational displacement in a circumferential direction between the inner and outer shafts.

2. The steering shaft of claim 1, wherein the outer splines of the splined portion of the inner shaft include teeth and teeth bottoms, the grooves of the shaft portion of the inner shaft including groove bottoms extending from the teeth bottoms of the outer splines and in the axial direction, the groove bottoms defining a dedendum diameter of the shaft portion that is less than a dedendum diameter of the splined portion defined by the teeth bottoms of the outer splines to thereby form a first transitional step between the groove bottoms and the teeth bottoms of the outer splines, the inner periphery of the resin member engaging and interlocking with the groove bottoms, the teeth and teeth bottoms of the outer splines, and the first transitional step.

3. The steering shaft of claim 2, wherein the shaft portion of the inner shaft includes teeth formed between the grooves, the teeth formed between the grooves extending from the teeth of the outer splines and in the axial direction, the teeth formed between the grooves defining an addendum diameter of the shaft portion that is less than the an addendum diameter of the splined portion defined by the teeth of the outer splines to thereby define a second transitional step between the teeth formed between the grooves and the teeth of the outer splines, the inner periphery of the resin member engaging and interlocking with the teeth formed between the grooves and the second transitional step.

4. The steering shaft of claim 1, wherein a slight clearance gap is formed between the inner and outer splines to allow the inner and outer splines to slide relative to each other, the sliding resin member engaging and interlocking with the inner and outer splines to thereby prevent rotational displacement between the inner and outer shafts.

5. A method of preventing rotational displacement between inner and outer shafts of a steering shaft assembly, the inner shaft having grooves formed in an outer surface of the inner shaft, the outer shaft having inner splines formed on an inner surface of the outer shaft, the inner splines including teeth and teeth bottoms, comprising:
   engaging and interlocking inner and outer peripheral surfaces of a slidable resin member respectively with the grooves of the inner shaft and the teeth and teeth bottoms of the inner splines of the outer shaft to thereby prevent rotational displacement in a circumferential direction between the inner and outer shafts, while permitting axial displacement between the inner and outer shafts.

* * * * *